Oct. 29, 1929.  J. W. ARNOLD  1,733,391
REAR VIEW MIRROR
Filed Oct. 7, 1927
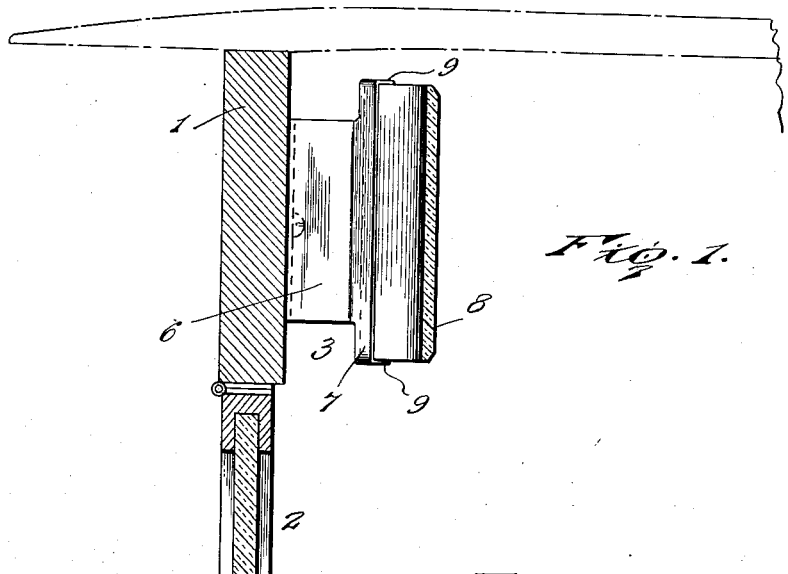
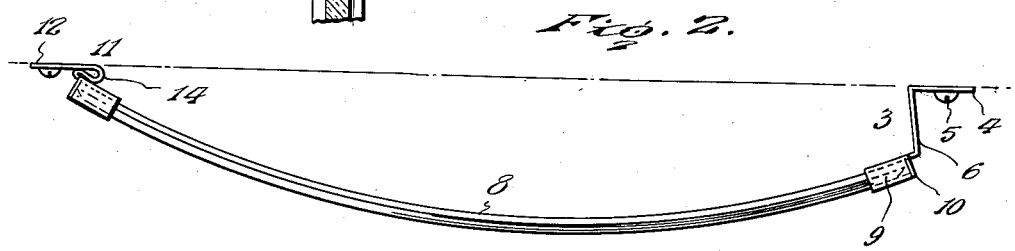
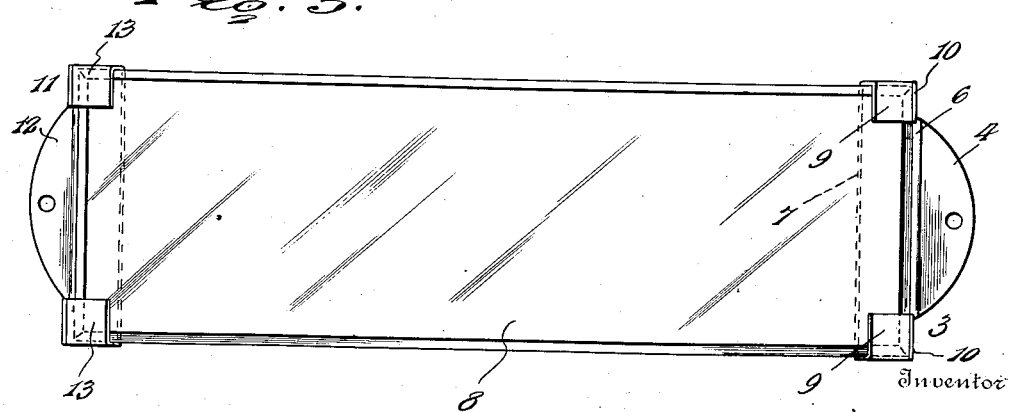
Inventor
J. W. Arnold.
By Lacey & Lacey, Attorneys Patented Oct. 29, 1929

1,733,391

UNITED STATES PATENT OFFICE

JOSEPH WARREN ARNOLD, OF CAPE MAY, NEW JERSEY

REAR-VIEW MIRROR

Application filed October 7, 1927. Serial No. 224,714.

This invention is a rear-view mirror for use in closed motor vehicles. It is well known that in the operation of motor vehicles it is highly desirable that the chauffeur be apprized as to traffic conditions in his rear in order that he may avoid possible collisions with a vehicle at his rear when he is attempting to make a turn or stops the travel of his own vehicle. For this purpose, mirrors have been provided which, in closed cars, are mounted upon the upper portion of the windshield frame but such mirrors heretofore have been flat and afforded a view only of the road directly in rear so that conditions at either side of a direct rear line of vision could be observed only by the chauffeur shifting in his seat and possibly momentarily losing control of his vehicle. Statistics have shown that nearly fifty per cent of all collisions of automobiles occur from the rear and are due to the incomplete or imperfect view afforded by the ordinary rear-view mirror as now generally arranged. The object of the present invention is to provide an exceedingly simple and inexpensive device whereby the chauffeur will have a view of the side of the road at his rear as well as directly at the rear without requiring him to shift in his seat or move his head, so that he will at no time be compelled to lose sight of the road ahead. This object is accomplished by the means illustrated in the accompanying drawing, and the invention resides in certain novel features which will be particularly pointed out in the appended claims.

In the drawing:

Figure 1 is a sectional elevation of a rear-view mirrow embodying the present invention and showing the same in its position upon the windshield frame.

Figure 2 is a top plan view of the mirror, and,

Figure 3 is a rear elevation.

In the drawing, the reference numeral 1 indicates a portion of the top of the windshield frame which may be of the usual or any approved construction and in which the windshield is mounted in the usual manner, a portion of the windshield being indicated at 2. Secured to the frame member 1 is a bracket 3 which is shown as including a base 4, through which a screw 5 or the like may be inserted into the frame 1, and an arm or web 6 projecting from the base. At its rear or free edge, the arm 6 is turned laterally to form a backing strip 7 for the mirror 8, and at the upper and lower corners of said strip are tongues 9 and 10 which are folded toward each other to form boxes receiving the corners of the mirror, as will be understood on reference to Figure 3. The described bracket or support is employed at the right hand end of the mirror and a bracket 11 is provided to support the left-hand end of the mirror, said bracket having a base 12 and corner boxes 13 and being the same as the first described bracket except that the intermediate arm or web is collapsed, as shown at 14, whereby the corresponding end of the mirror is brought close to the frame 1. The brackets may be easily stamped from sheet metal and will be light but will firmly support the mirror and hold it against endwise movement. They may be finished to harmonize with the trimmings of the car and will be inconspicuous. The mirror 8 according to the present invention, is arcuate in form and presents a convex surface to the rear but in its vertical extent is flat or plane, as clearly shown in Figure 1.

With the use of a convex mirror, as shown in the drawing, the operator of a motor vehicle is afforded a view of the road not only directly at his rear but also at the side so that he will be definitely informed as to whether a vehicle is in the act of passing him as well as of the traffic conditions directly in rear of his own vehicle, and he is thereby enabled to refrain from turning off a direct path or from backing his own vehicle when the conditions are such that collisions may result. By having the mirror plane or flat in its vertical extent, distortion of the objects reflected therein is avoided without in any way decreasing the enlarged range of view afforded by the convexity of the reflecting surface, and by having the left hand end of the mirror brought close to the frame it is so disposed that a mere glance will advise the chauffeur of conditions without any necessity of turning his head or shifting his position. The mirror is preferably constructed of heavy beveled plate glass so as to provide clear sharp reflections of the objects in the vicinity of the vehicle and, of course, the arc defined by the mirror may be of any suitable extent, ordinarily a range of from ten to seventy degrees being sufficient and practicable. My improved mirror may be produced and mounted in a vehicle at approximately the same cost as the ordinary flat mirrors now generally employed, and by its use a greatly increased range of view over the usual mirror is attained while the space occupied by the mirror in the car may be no greater than occupied by the less desirable mirrors now in use.

Having thus described the invention, I claim:

1. A device of the class described comprising a reflecting plate curved longitudinally to provide a transversely convexed mirror, and mounting brackets at the ends of said plate each having a base adapted to be secured to a support, a web extending from its base, a backing plate projecting from the web, and tongues projecting from upper and lower ends of the backing plate and bent to form boxes open along their inner sides, said reflecting plate having its end portions overlapping the backing plates and its corner portions received in said boxes to support the reflecting plate between the brackets.

2. A device of the character described comprising a reflecting plate curved longitudinally to provide a transversely convexed mirror and mounting brackets at the ends of said plate each having a base adapted to be secured to a support, a web extending from its base, and means at the outer end of the web to engage and hold an end portion of the reflecting plate whereby the reflecting plate may be supported between the brackets, one bracket having its web extending straight from its base and the other bracket having its web folded transversely whereby the brackets will support the reflecting plate at a transverse incline.

In testimony whereof I affix my signature.

JOSEPH WARREN ARNOLD. [L. S.]